US012627485B2

(12) United States Patent
Boesch et al.

(10) Patent No.: US 12,627,485 B2
(45) Date of Patent: May 12, 2026

(54) METHOD FOR PROVIDING CORRELATED RANDOMNESS FOR SECURE MULTIPARTY COMPUTATION

(71) Applicant: Robert Bosch GmbH, Stuttgart (DE)

(72) Inventors: Christoph Boesch, Kirchentellinsfurt (DE); Jonas Eppard, Sindelfingen (DE); Sven Trieflinger, Renningen (DE); Vincent Sebastian Rieder, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 51 days.

(21) Appl. No.: 18/662,061

(22) Filed: May 13, 2024

(65) Prior Publication Data

US 2024/0405982 A1 Dec. 5, 2024

(30) Foreign Application Priority Data

May 30, 2023 (DE) ...................... 10 2023 205 012.9

(51) Int. Cl.
*H04L 9/08* (2006.01)
*G06F 21/57* (2013.01)
(52) U.S. Cl.
CPC ............ *H04L 9/0869* (2013.01); *G06F 21/57* (2013.01)
(58) Field of Classification Search
CPC ...................................................... H04L 9/0869
See application file for complete search history.

(56) References Cited

U.S. PATENT DOCUMENTS

| | | | |
|---|---|---|---|
| 10,601,590 B1 * | 3/2020 | Chhabra ................. | G06F 21/44 |
| 11,184,166 B2 * | 11/2021 | Lampkins ............. | H04L 9/0869 |
| 2002/0076052 A1 * | 6/2002 | Yung ..................... | H04L 9/3218 |
| | | | 380/277 |
| 2004/0049387 A1 * | 3/2004 | Jeong ..................... | G10L 15/12 |
| | | | 704/241 |
| 2025/0080349 A1 * | 3/2025 | Wang ................... | H04L 9/0897 |

* cited by examiner

*Primary Examiner* — Simon P Kanaan
(74) *Attorney, Agent, or Firm* — NORTON ROSE FULBRIGHT US LLP

(57) ABSTRACT

A computer-implemented method for providing correlated randomness for secure multiparty computation using a plurality of computing machines. The method includes: executing a trusted execution environment system; setting up at least one correlated randomness generator in the trusted execution environment system; remote attestation of a single correlated randomness generator by all computing machines or remote attestation of a plurality of correlated randomness generators by in each case one computing machine; injecting in each case at least one secret by all computing machines into a single correlated randomness generator or injecting at least one secret by one computing machine into in each case one correlated randomness generator; checking the injected secrets by the correlated randomness generator(s); generating correlated randomness for the computing machines depending on the injected secrets; distributing the correlated randomness to the computing machines, wherein each computing machine receives only the correlated randomness created for it.

14 Claims, 3 Drawing Sheets

| | |
|---|---|
| execution of trusted execution environment system | 51 |
| set up correlated randomness generator | 52 |
| remote attestation | 53 |
| inject secret | 54 |
| check injected secrets | 55 |
| generate correlated randomness | 56 |
| distribute correlated randomness | 57 |

METHOD FOR PROVIDING CORRELATED RANDOMNESS FOR SECURE MULTIPARTY COMPUTATION

CROSS REFERENCE

The present application claims the benefit under 35 U.S.C. § 119 of German Patent Application No. DE 10 2023 205 012.9 filed on May 30, 2023, which is expressly incorporated herein by reference in its entirety.

BACKGROUND INFORMATION

Modern protocols for secure multiparty computation (MPC) work according to the so-called pre-processing model. The result of an input-independent offline phase is correlated randomness (CR) in the form of secret, shared tuples of body elements that are consumed in an input-dependent online phase in order to make operations such as multiplication more efficient. Existing offline phase protocols, also referred to as correlated randomness generators (CRG) in the following, are based on heavyweight cryptographic constructions such as homomorphic encryption or oblivious transfer. They suffer from high computing and communication complexity.

SUMMARY

A first general aspect of the present invention relates to a method for providing correlated randomness for secure multiparty computation using a plurality of computing machines.

According to an example embodiment of the present invention, the method comprises Execution of a trusted execution environment system, Setting up of at least one correlated randomness generator in the trusted execution environment system, Remote attestation of a single correlated randomness generator by all computing machines or remote attestation of a plurality of correlated randomness generators by in each case one computing machine, Injection in each case of at least one secret by all computing machines into a single correlated randomness generator or injection of at least one secret by one computing machine into in each case one correlated randomness generator, Check of the injected secrets by the correlated randomness generator(s), Generation of correlated randomness for the computing machines depending on the injected secrets, Distribution of the correlated randomness to the computing machines, wherein each computing machine only receives the correlated randomness created for it.

A second general aspect of the present invention relates to a computer system designed to execute the method according to the first general aspect (or an embodiment thereof) of the present invention.

A third general aspect of the present invention relates to a computer program designed to execute the method according to the first general aspect (or an embodiment thereof) of the present invention.

A fourth general aspect of the present invention relates to a computer-readable medium or signal that stores and/or contains the computer program according to the third general aspect (or an embodiment thereof) of the present invention.

The techniques of the first, second, third and fourth general aspects of the present invention may in some situations have one or more of the following advantages.

The present invention allows cost-effective secure multiparty computation in the pre-processing model with active security and a dishonest majority by replacing resource-intensive existing methods based on advanced cryptography with methods that use confidential computing (CC) techniques with low overhead either independently or in combination with more efficient, actively secure honest-majority MPC protocols.

The total costs of secure multiparty computation MPC in the pre-processing model are largely dominated by the costs of the offline phase (the factor is up to one order of magnitude). The present disclosure utilizes confidential computing (CC) techniques to significantly reduce the costs of the offline phase. These techniques rely on security mechanisms that can be supported by hardware devices in order to ensure the confidentiality and integrity of sensitive workloads.

The present invention allows the strength of security guarantees to be exchanged for performance and covers a range of deployment scenarios with varying deployment complexity, security and performance characteristics. With them, the costs of MPC in the pre-processing model can be reduced by at least one order of magnitude (for the per-party TEE-MPC CRG variant shown in FIG. 4) by strengthening the trust assumptions and generating the security guarantees through cryptographic, formally provable guarantees or through hardware and trust guarantees. In this case, this is the generation of the secret, shared correlated random value.

The present invention is superior to the following approaches:

Direct use of confidential computing CC, i.e., without secure multiparty computation MPC, to secure workloads: By integrating complex workloads into a trusted execution environment (TEE), a large trusted computing base (TCB) is created, which potentially provides a large attack surface for side-channel attacks. According to the present disclosure, the trusted execution environment TEE contains comparatively few complex, small workloads. That is to say, either a logic for generating the correlated randomness CR locally or a medium-complex, medium-size, specific, actively secure honest-majority-secure MPC protocol implementation for generating the correlated randomness CR.

Use of a TEE-protected, actively secure, generic honest-majority MPC protocol to secure the workload: The complexity and scope of a generic honest-majority MPC protocol is significantly greater than a protocol specifically tailored for generating correlated randomness CR according to the present disclosure.

The present invention allows implementations with different trade-offs in terms of computing/communication complexity and security.

Some terms are used in the present disclosure in the following way.

"Secure multiparty computation" (MPC) is a cryptographic protocol that distributes a computation among a plurality of parties, wherein no single party can see the data of the other parties.

The term "MPC party" comprises participants in secure multiparty computation MPC, such as computing machines, network participants, etc.

A "trusted execution environment" (TEE) is an environment for executing code where those executing the code can have a high level of trust in that environment since it can disregard threats from the rest of the device. Generally, TEEs protect the confidentiality and integrity of workloads. The terms TEE and confidential computing (CC) are used synonymously in this document.

"Remote attestation" (PA) is a CC technique used by a system to authenticate its hardware and software configuration to a remote system. The purpose of remote attestation is to allow a challenger to determine the degree of confidence in the integrity of a certifier's platform.

A "correlated randomness generator" (CRG) is a program that implements an algorithm that generates secretly shared correlated randomness in the form of so-called tuples.

Within the framework of the present disclosure, this term "correlated randomness generator" is used to refer to a particular implementation of a correlated randomness generator with the following parameters: The type of tuple to be generated, the number of tuples to be generated, a seed used to initialize a pseudorandom number generator (PRNG), and the shares of the message authentication code (MAC) keys (hereinafter referred to as m_i, where i is the index of the respective MPC party) for each MPC party of the MPC system. The seed for the correlated randomness generator is created in the trusted execution environment in which the correlated randomness generator is also executed.

MACs are required to achieve active security in an environment with malicious participants. It should be considered that the MAC keys can either be generated by the CRG on request or collected by the parties for which the correlated randomness is generated. In the first case, an existing resharing protocol must be used, which adapts the tuple shares of the correlated randomness to the MAC keys of the receiving MPC system. For reasons of readability, the latter case is considered below, although both cases are covered by the present disclosure. The correlated randomness generator initializes a PRNG with the specified seed in order to compute the secret shares of the requested CR tuples for all players. This correlated randomness generator is instantiated either as a regular program or as an MPC program in the variants described here. It should be considered that the secure PRNG function of the TEE implementation is used when executing the CRG in a TEE (for example, sgx_read_rand in the case of Intel SGX).

DETAILED DESCRIPTION OF EXAMPLE EMBODIMENTS

FIG. 1 to 4 illustrate various examples of systems 10 for providing correlated randomness for secure multiparty computation according to the present disclosure. All systems 10 comprise at least one trusted execution environment in which a correlated randomness generator is set up.

Figure 1:
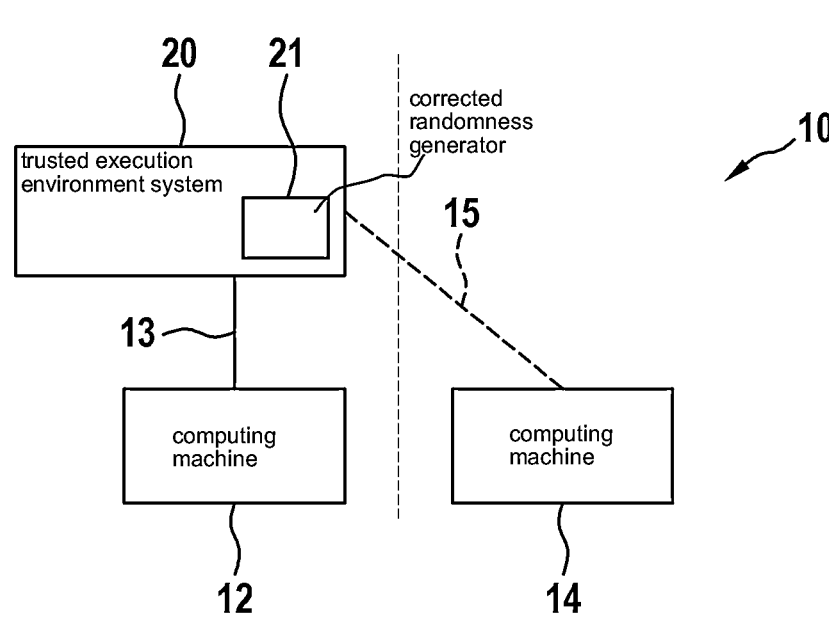
FIG. 1 schematically shows a system for providing correlated randomness for secure multiparty computation according to an example embodiment of the present invention.

FIG. 1 shows a single trusted execution environment (TEE) with a correlated randomness generator (CRG), i.e., a single TEE-CRG.

Figure 2:
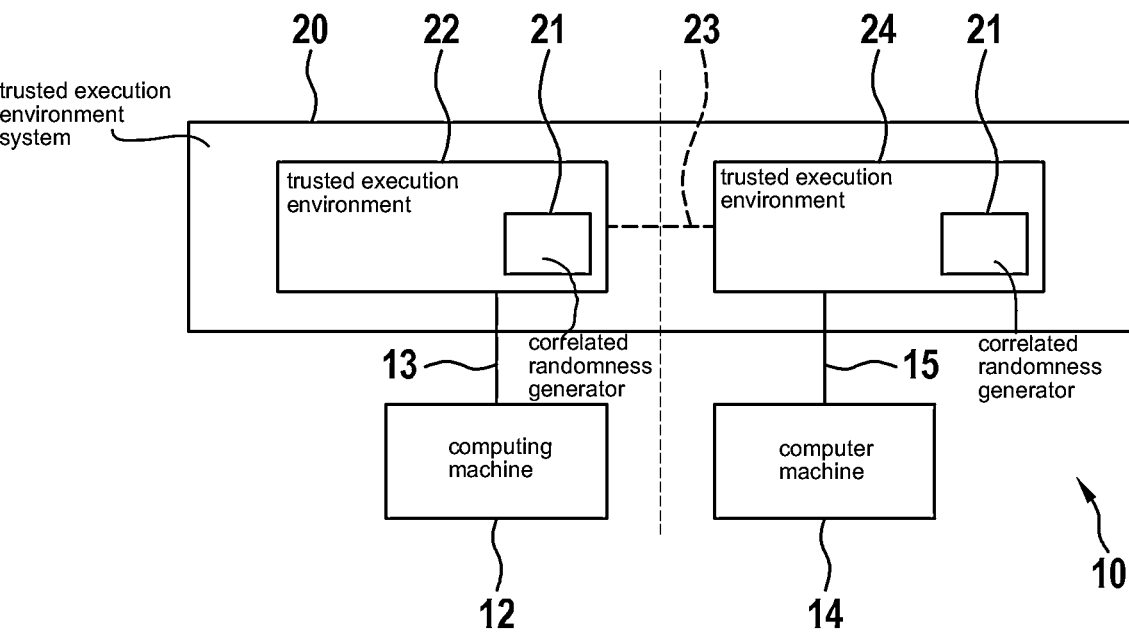
FIG. 2 schematically shows a system for providing correlated randomness for secure multiparty computation according to an example embodiment of the present invention.

FIG. 2 shows a trusted execution environment (TEE) with a correlated randomness generator (CRG) per party, i.e., per-party TEE-CRG.

Figures 3, 4:
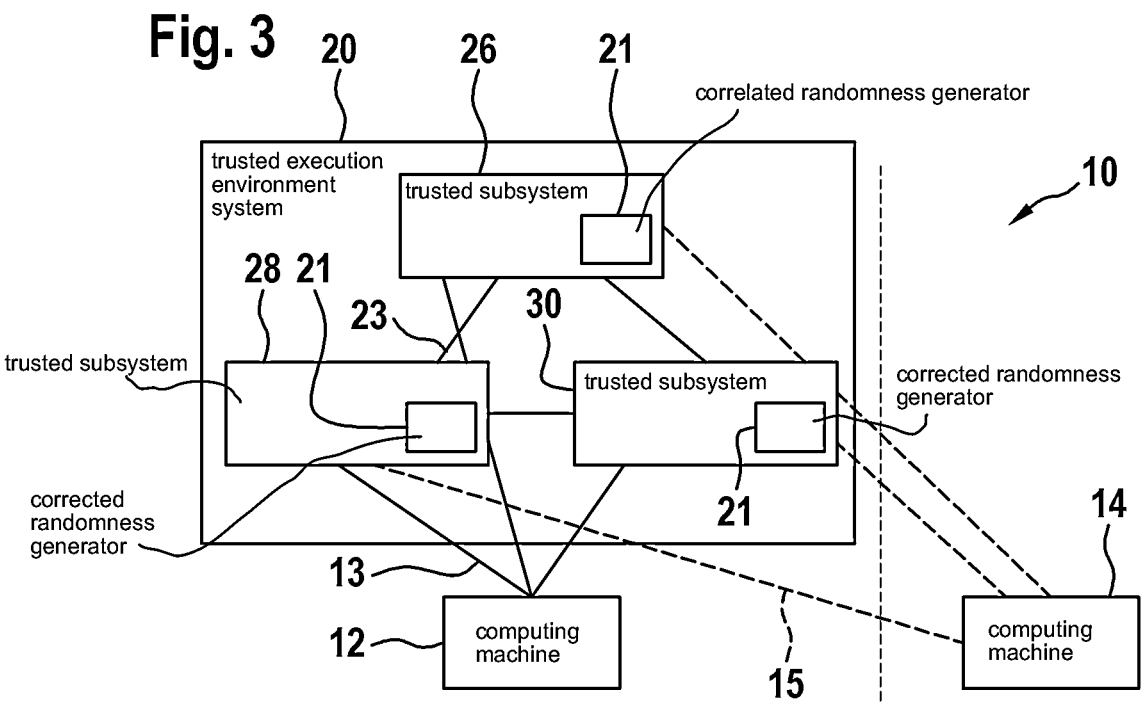
FIG. 3 schematically shows a system for providing correlated randomness for secure multiparty computation according to an example embodiment of the present invention.
FIG. 4 schematically shows a system for providing correlated randomness for secure multiparty computation according to an example embodiment the present invention.

FIG. 3 shows a single trusted execution environment (TEE) with a correlated randomness generator (CRG) comprising honest-majority MPC protocols between a plurality of TEE-protected subsystems, i.e., single TEE-MPC-CRG.

FIG. 4 shows a single trusted execution environment (TEE) with a correlated randomness generator (CRG) comprising honest-majority MPC protocols between a plurality of TEE-protected subsystems per party, i.e., per-party TEE-MPC-CRG.

The complexity of the areas (trusted computing base, TCB) is compared below.

The complexity of communication is divided into the categories local area network (LAN) and wide area network (WAN). The first category is cost-effective communication with low latency and high bandwidth via a LAN within the same data center (on-site or in the cloud), for example with $\mu$s latency and 100 Gbit/s. The second category is the more expensive communication with high latency and low bandwidth over a WAN between different data centers, for example between a plurality of on-site data centers, a plurality of regions of the same public cloud, or between data centers of different public clouds, for example with ms latency and 1 Gbit/s. In the following, the LAN communication channels are shown as solid lines and the WAN communication channels as broken lines. It should be noted that the WAN communication complexity for the per-party variants is independent of the number of CR tuples generated.

The following notation is used:

n refers to the number of MPC parties in the assigning MPC system, t stands for the number of tuples to be generated.

Note that n is likely to be in the lower single-digit range, usually between 2 and 5, while t is in the order of magnitude of billions. For cases where the CRG itself is implemented via MPC (with an honest-majority protocol):

m refers to the number of MPC parties in the CRG MPC system,

P(n, m, t) is the runtime complexity of the MPC protocol in question,

C(n, m, t) is the respective communication complexity.

For the single TEE-CRG, the runtime complexity is in the order of magnitude $O$ (n t), the complexity of LAN communication is in the order of magnitude $O$ (t), and the complexity of WAN communication is in the order of magnitude $O$ (n t). The security mechanism is based on a single TEE implementation. The size of the trusted computing base is small since only a simple implementation of the CRG logic is effected.

For the per-party TEE-CRG, the runtime complexity is in the order of magnitude $O$ ($n^2$ t), the complexity of LAN communication is in the order of magnitude $O$ (n t), and the complexity of WAN communication is in the order of magnitude $O$ ($n^2$). The security mechanism is based on a single TEE implementation per computing machine. The size of the trusted computing base is small since only a simple implementation of the CRG logic is effected.

For the single TEE-MPC-CRG, the runtime complexity is in the order of magnitude $P(n, m, t)$, the complexity of LAN communication is in the order of magnitude $O(m\ t+C(n, m, t))$, and the complexity of WAN communication is in the order of magnitude $O(m\ n\ t)$. The security mechanism is based on a plurality of TEE implementations. The size of the trusted computing base is medium since a specialized MPC protocol implementation is used for CR generation.

For the per-party TEE-MPC-CRG, the runtime complexity is in the order of magnitude $O(n\ P(n, m, t))$, the complexity of LAN communication is in the order of magnitude $O(n\ m\ t+n\ C(n, m, t))$, and the complexity of the WAN communication is in the order of magnitude $O(m^2n^2)$. The security mechanism is based on a plurality of TEE implementations. The size of the trusted computing base is medium since a specialized MPC protocol implementation is used for CR generation.

FIG. 1 schematically shows a system 10 for providing correlated randomness for secure multiparty computation according to the present disclosure, comprising a trusted execution environment with a correlated randomness generator, i.e., a single TEE-CRG.

This can be regarded as the simplest variant of the proposed system 10. Here, the trusted execution environment system 20 consists of a single trusted execution environment, in which a single correlated randomness generator 21 is executed. Two computing machines 12 and 14 are shown by way of example. These computing machines are parties to the system 10 for secure multiparty computation. There may be a plurality of parties or computing machines in the system 10, for example two to five. The system 10 can be a component of a cloud system or can itself be a cloud system. In particular, the system 10 can be a cloud stack for building scalable applications for secure multiparty computations or a part thereof.

The sequence of the system 10 can be shown as follows. One of the computing machines 12 and 14 or an external unit starts a process-based or VM-based trusted execution environment 20. The trusted execution environment 20 can be physically located at one of the computing machines 12 and 14 or at another location. In the case shown in FIG. 1, the computing machine 12 will start and possibly execute the trusted execution environment 20 since the two entities are connected via a party communication link 13 in the form of a low-latency, high-bandwidth LAN connection. The other computing machine 14 is connected to the trusted execution environment 20 via another party communication link 15 in the form of a high-latency, low-bandwidth WAN connection. For example, in FIG. 1, the part to the left of the vertical dashed line can be in a computer, rack, server, data center, or on-premise. The right-hand part is remote therefrom and can be reached via the Internet, for example.

A correlated randomness generator 21 is used within the trusted execution environment 20. This can be done as a compiled binary file or as interpreted code. Public parameters, for example arithmetic parameters such as power, prime number, type and number of query tuples, can be hard-coded into the logic or made available to the hosting environment as arguments. This can be done via environment variables, for example.

Both MPC computing machines 12 and 14 carry out remote attestation in order to establish trust in the correlated randomness generator 21, which is protected in the trusted execution environment 20. If the remote attestation is successful, the computing machines 12 and 14 "know" that the hardware and/or software state of the correlated randomness generator 21 protected in the trusted execution environment 20 is as expected. In this connection, the computing machines 12 and 14 can optionally explicitly check the public configuration provided in the previous step and abort the process if the configuration does not meet expectations.

The computing machines 12 and 14 inject secrets in the form of relevant secret parameters, for example their MAC key shares, into the correlated randomness generator 21 protected in the trusted execution environment 20. This can be carried out using secret injection mechanisms available in remote attestation systems.

The correlated randomness generator 21, which is protected in the trusted execution environment 20, checks whether the parameters are correct and compatible. This can also comprise checking the MAC keys for correctness. Such checks can be byte checks or plausibility checks, for example.

The logic of the correlated randomness generator 21 starts and begins to generate correlated randomness according to the entered secrets and optionally also the configuration. The correlated randomness shares for all computing machines 12 and 14 are generated by the correlated randomness generator 21 protected in the trusted execution environment 20. If a PRNG is used for the generator, the seed must still be generated by (for example, sgx_read_rand( ) in the case of Intel SGX) within the trusted execution environment. The generator can generate a seed or agree on a seed with other generators. The difference between a random material generator and a random number generator is that the random number generator always needs the seed, whereas the random material generator does not.

The secret shares of the generated correlated randomness are transmitted to the respective computing machines 12 and 14 either in bulk at the end of the generation process or in parallel to the generation process via streaming mechanisms. Each party only receives the shares of the correlated randomness that were created for it.

FIG. 2 schematically shows a system 10 for providing correlated randomness for secure multiparty computation according to the present disclosure, in each case comprising a trusted execution environment with in each case one correlated randomness generator per party, i.e., per-party TEE-CRG.

Here, the trusted execution environment system 20 consists of two trusted execution environments 22 and 24, in which in each case a correlated randomness generator 21 is executed. Two computing machines 12 and 14 are shown by way of example. The fact that two trusted execution environments are provided here is only by way of example; in the case of per-party TEE-CRG, there are exactly as many trusted execution environment systems as there are parties in the system 10. These computing machines are parties to the system 10 for secure multiparty computation. There may be a plurality of parties or computing machines in the system 10, for example two to five. The system 10 can be a component of a cloud system or can itself be a cloud system. In particular, the system 10 can be a cloud stack for building scalable applications for secure multiparty computations or a part thereof.

The basic idea of this variant is to set up a separate collocated trusted execution environment 22 or 24 for each of the MPC parties, in which environment in each case the logic of the correlated randomness generator 21 is housed.

The sequence in this case can be as follows. Each MPC party or computing machine 12, 14 starts a process-based or VM-based trusted execution environment 22, 24. Alternatively, this can also be effected by an external device. The trusted execution environment 22, 24 is physically located at a common location or at least in proximity to the respective MPC party in terms of network latency and thus should provide low costs and high transmission bandwidth. Following the terminology introduced above, the MPC parties use LAN channels 13, 15 for communication with "their" correlated randomness generator 21 protected in the respective trusted execution environment 22, 24. On the other hand, the correlated randomness generators 21 can use WAN channels 23 to communicate with one another. Within the trusted execution environments 22, 24, the logic of the correlated randomness generator 21 is used in each case. This can be the case, for example, as compiled binary code or as interpreted code.

Each MPC participant carries out remote attestation in order to establish trust in the correlated randomness generator 21, which is protected in the trusted execution environment 22, 24. If the remote attestation is successful, the computing machines 12 and 14 "know" that the hardware and/or software state of the correlated randomness generator 21 protected in the trusted execution environment 22, 24 is as expected. Public parameters, for example arithmetic parameters such as power, prime number, type and number of query tuples, can be hard-coded into the logic or provided as arguments for the hosting environment, for example via environment variables.

The computing machines 12 and 14 inject secrets in the form of relevant secret parameters, for example their MAC key shares, into the respective correlated randomness generator 21 protected in the corresponding trusted execution environment 22, 24. This can be carried out using secret injection mechanisms available in remote attestation systems. If the remote attestation fails, the secret parameters are not injected and the process is aborted.

Each correlated randomness generator 21 protected in the trusted execution environments 22, 24 checks whether the parameters are correct and compatible. This can comprise, for example, the same MAC key, prime number, etc. With the aid of remote attestation, the trusted execution environments 22, 24 check whether their configuration is compatible and correct.

The trusted execution environments 22, 24 securely exchange the MAC key shares using the secret injection, which is provided by the remote attestation, and optionally check their harmlessness. Alternatively, the MPC parties can inject their MAC key shares into all trusted execution environments.

The correlated randomness generators 21 protected in the trusted execution environments 22, 24 agree on a common value, which is later used as a seed by the random number generators, and on a unique participant number for each of them. This is again done using remote attestation and the secure injection of secrets, as previously explained.

A concrete approach to ensuring that the same seed and a unique participant number are used is to allow a correlated randomness generator 21 to decide on the seed and the assignment of the participant number. Either the generator can create the seed itself or a further support system of the trusted execution environment is present. Since mutual trust in the hosting trusted execution environment 22 or 24 has been previously established by remote attestation, the correlated randomness generators 21 can be sure that the allocation list is valid, i.e., that each participant has a unique participant number and that each correlated randomness generator 21 is using the assigned participant number and the specified seed.

The logic of the correlated randomness generators 21 starts and begins to generate correlated random numbers according to the parameters. In particular, the same seed that is used to generate the correlated randomness is used for the random number generator. Consequently, all correlated randomness generators 21 protected in the trusted execution environments 22, 24 generate exactly the same correlated randomness locally for all parties. The agreed assignment of participant numbers ensures that each of the correlated randomness generators 21 protected in the trusted execution environments 22, 24 delivers only the respective secret shares of the correlated randomness to the respective party. This respective party is the party that started or hosts the trusted execution environment.

The secret shares of the generated correlated randomness are transmitted to the respective parties either in bulk at the end of the generation process or in parallel to the generation process via streaming mechanisms.

FIG. 3 schematically shows a system 10 for providing correlated randomness for secure multiparty computation according to the present disclosure, comprising a trusted execution environment system 20 with a correlated randomness generator comprising honest-majority MPC protocols between a plurality of TEE-protected subsystems, i.e., single TEE-MPC-CRG.

Here, the trusted execution environment system 20, for example, consists of three trusted subsystems 26, 28, 30, in each case with a trusted execution environment, in which in each case a correlated randomness generator 21 is executed. The correlated randomness generators 21 shown can be regarded by way of example. In fact, the trusted subsystems 26, 28, 30 of the trusted execution environment system 20 can form a generator as an honest-majority protocol.

It is possible to have more than three subsystems, for example up to ten or five subsystems. The number of subsystems does not have to correlate with the number of computing machines. One or more computing machines can themselves be part of the generator.

Two computing machines 12 and 14 are shown by way of example. These computing machines are parties to the system 10 for secure multiparty computation. There may be a plurality of parties or computing machines in the system 10, for example two to five. The system 10 can be a component of a cloud system or can itself be a cloud system. In particular, the system 10 can be a cloud stack for building scalable applications for secure multiparty computations or a part thereof.

The basic idea of this scheme is to use more efficient, active, secure honest-majority MPC protocols between a plurality of protected subsystems 26, 28, 30 of trusted execution environments to generate the correlated randomness. These protocols do not require an offline phase and have a computing complexity that is by up to two orders of magnitude lower and a communication complexity that is by up to three orders of magnitude lower than actively secure dishonest-majority MPC protocols.

The MPC participants are used in close proximity to one another with LAN channels 13 and 23 with low latency and high bandwidth. The comparatively small secret shares of the generated correlated randomness are transmitted over WAN communication channels 15 with potentially high latency and low bandwidth to all participants, except the single computing machine that cooperates with the subsystems 26, 28, 30 protected by trusted execution environments.

With this and the following variant, it is provided to use different implementations of trusted execution environments for each of the correlated randomness generators 21 protected by subsystems 26, 28, 30. This means that an attacker would have to breach the security of more than half of the participating trusted execution environments or subsystems 26, 28, 30 simultaneously in order to breach the security of the system 10.

The sequence in this case can be as follows. An MPC participant or a computing machine 12, 14 or an external entity starts the required number of process-based or VM-based subsystems 26, 28, 30 in each case with a correlated randomness generator 21 protected in a trusted execution environment 20. These subsystems 26, 28, 30 are themselves MPC participants. All trusted execution environments 26, 28, 30 are physically located together, for example in the same data center, and in proximity to one of the computing machines, here the computing machine 12. "In proximity" refers to a low network latency. There should be a transmission of high bandwidth via a LAN channel 23 and 13.

Within the trusted execution environments 26, 28, 30, the protocol logic of a correlated randomness generator 21 is used in each case. This can be done as compiled binary code or as interpreted code. The logic consists of a specific, actively secure honest-majority MPC protocol implementation for generating correlated randomness. Public parameters, for example arithmetic parameters such as power, prime number, type and number of requested tuples, can be hard-coded in the logic or made available to the hosting environment as arguments, for example via environment variables.

Each MPC party or computing machine 12, 14 carries out remote attestations in order to establish trust in all correlated randomness generators 21 protected in the respective trusted execution environments 26, 28, 30. For example, in the situation shown in FIG. 3, the computing machine 12 carries out a remote attestation with respect to the correlated randomness generators 21 protected in the respective trusted execution environments 26, 28, 30, i.e., the corresponding MPC subsystems. If the remote attestation is successful, the computing machines 12, 14 "know" that the hardware and/or software state of the correlated randomness generators 21 protected in the trusted execution environments 26, 28, 30 is as expected. If the remote attestation fails, the process is aborted.

The computing machines 12 and 14 inject secrets in the form of relevant secret parameters, for example their MAC key shares, into the correlated randomness generators 21 protected in the trusted execution environments 26, 28, 30 (MPC subsystems), using secret sharing.

For the MAC key shares and assuming correlated randomness generators 21 protected in the trusted execution environments 26, 28, 30 with m MPC subsystems, each computing machine 12, 14 divides its MAC key share into m shares and sends one of the shares to each MPC subsystem in the form of a correlated randomness generator 21 protected in the trusted execution environment. This means that none of the MPC subsystems in the form of a correlated randomness generator 21 protected in the trusted execution environment is in possession of or can reconstruct the secret full MAC key of the MPC parties. Even if m/2-1 parties are corrupted due to a compromised implementation of the trusted execution environment, the security guarantees still apply.

The MPC subsystems or their trusted execution environments use the remote attestation among themselves to check whether their configuration is compatible and correct. This check is effected via LAN channels 23.

The correlated randomness generator 21 protected in each case in the MPC subsystem in the form of the trusted execution environment begins generating correlated randomness using the previously described configuration parameters as public inputs and (at least) the secret shared MAC key as private input. Here, the generation of correlated randomness is implemented as an MPC program that works with secret shared data.

Therefore, none of the MPC subsystems in the form of a correlated randomness generator 21 protected in the trusted execution environment can read the generated correlated randomness if at least m/2+1 parties are honest, i.e., their underlying implementation of the trusted execution environment is not broken. The result of the generation process is secret shares of the MPC subsystem in the form of a correlated randomness generator 21 protected in the trusted execution environment, on the secret shares of the correlated randomness for the requesting computing machine.

The secret shares of the correlated randomness for the requesting computing machine are transmitted to the respective computing machines 12 and 14 either as bulk at the end of the generation process or in parallel to the generation process via streaming mechanisms. For this purpose, each correlated randomness generator 21 protected in a trusted execution environment sends all shares for a particular MPC party of each tuple share of the correlated randomness to the respective computing machines 12 and 14.

FIG. 4 schematically shows a system 10 for providing correlated randomness for secure multiparty computation according to the present disclosure, comprising a trusted execution environment system 20 with a correlated randomness generator comprising honest-majority MPC protocols between a plurality of TEE-protected subsystems per party, i.e., per-party TEE-MPC-CRG.

Here, the trusted execution environment system 20 consists of two trustworthy execution environments 32 and 34, which in each case consist of a plurality of trusted subsystems 26, 28, 30, in each case with a trusted execution environment, in which in each case a correlated randomness generator 21 is executed. It is possible to have more than three subsystems, for example up to ten or five subsystems. The number of subsystems does not have to correlate with the number of computing machines.

Here, the trusted execution environments 32 and 34 consist of, for example, three trusted subsystems, in each case with a trusted execution environment, in which in each case a correlated randomness generator 21 is executed (as shown in FIG. 3). Thus, the system 10 shown in FIG. 4 can be considered a combination of the systems shown in FIGS. 2 and 3.

Two computing machines 12 and 14 are shown by way of example. These computing machines are parties to the system 10 for secure multiparty computation. There may be a plurality of parties or computing machines in the system 10, for example two to five. The system 10 can be a component of a cloud system or can itself be a cloud system. In particular, the system 10 can be a cloud stack for building scalable applications for secure multiparty computations or a part thereof.

The basic idea of this scheme is to deploy an instance of the trusted execution environment 32, 34 with MPC subsystems in the form of a correlated randomness generator protected in the trusted execution environment, at each computing machine 12, 14.

Here as well, the MPC subsystems in the form of a correlated randomness generator protected in the trusted execution environment agree on a common seed for the PRG used to generate the correlated randomness. In this way, all correlated randomness generators 21 of the MPC subsystems generate the same correlated randomness. In contrast to the system shown in FIG. 3, a transmission of the correlated randomness generated is not effected via expensive, high-latency, low-bandwidth WAN communication channels.

Each MPC party or each computing machine 12, 14 or an external unit starts a number m of process-based or VM-based trusted execution environments. These trusted execution environments in each case form an MPC subsystem, with in each case correlated randomness generators 21 protected in trusted execution environments. The trusted execution environments for the same MPC subsystem, in each case with correlated randomness generators 21 protected in trusted execution environments, are physically located in proximity to the respective computing machine 12, 14 or are at least located in proximity to the respective computing machine 12, 14 in terms of network latency and should allow for transmission with high bandwidth.

Within the trusted execution environments, the protocol logic of a correlated randomness generator 21 is used in each case. This can be done as compiled binary code or as interpreted code. The logic consists of a specific, actively secure honest-majority MPC protocol implementation for generating correlated randomness. Public parameters, for example arithmetic parameters such as power, prime number, type and number of requested tuples, can be hard-coded in the logic or made available to the hosting environment as arguments, for example via environment variables.

Each MPC party or computing machine 12, 14 carries out remote attestations in order to establish trust in all correlated randomness generators 21 protected in the respective trusted execution environments 32, 34 in MPC subsystems. For example, in the situation shown in FIG. 4, the computing machine 12 carries out a remote attestation with respect to the correlated randomness generators 21 protected in the trusted MPC subsystem.

If the remote attestation is successful, the computing machines 12, 14 "know" that the hardware and/or software state of the correlated randomness generators 21 protected in the trusted execution environments 32, 34 is as expected. If the remote attestation fails, the process is aborted.

The computing machines 12 and 14 inject secrets in the form of relevant secret parameters, for example their MAC key shares, into the respective correlated randomness generators 21 protected in the trusted execution environments 32, 34 (MPC subsystems), using secret sharing.

For the MAC key shares and assuming correlated randomness generators 21 protected in the trusted execution environments 32, 34 (MPC subsystems) with m MPC subsystems, each computing machine 12, 14 divides its MAC key share into m shares and sends one of the shares to each MPC subsystem in the form of a correlated randomness generator 21 protected in the trusted execution environment. This means that none of the MPC subsystems in the form of a correlated randomness generator 21 protected in the trusted execution environment is in possession of or can reconstruct the secret full MAC key of the MPC parties. Even if m/2-1 parties are corrupted due to a compromised implementation of the trusted execution environment, the security guarantees still apply.

All parties, protected in trusted execution environments, with a correlated randomness generator 21 of MPC subsystem #i, for example execution environment 32, carry out a remote attestation for all parties, protected in trusted execution environments, with a correlated randomness generator 21 of MPC subsystem #j, for example execution environment 34, viz., for all combinations i, j=1, . . . , n with i !=j. If a remote attestation fails, the process is aborted.

A common secret seed value used for secret pseudorandom number generation is generated as follows for all correlated randomness generators 21 protected in the trusted execution environments 32, 34 (MPC subsystems):

Each MPC subsystem #i has m protected generators $G\_i,k$. In the end, for each k, the protected generators $G\_1,k$, . . . . $G\_n$, k must have a common seed (and only these generators). Similarly to the MAC parts, the exchange takes place at generator level and not at MPC subsystem level.

Since the allocation of the participant numbers to the MPC subsystems protected in trusted execution environments is not sensitive, the following mechanism (as shown in FIG. 2) can be used for the allocation. In order to ensure that the same seed and a unique participant number are used, a correlated randomness generator will decide on the seed and the assignment of the participant number. Since mutual trust in the hosting trusted execution environments has been previously established by remote attestation, the correlated randomness generators can be sure that the allocation list is valid, i.e., that each participant has a unique participant number and that each correlated randomness generator is using the assigned participant number and the specified seed.

In order to generate the correlated randomness, each MPC subsystem protected by a trusted execution environment executes an MPC protocol as described for the system shown in FIG. 3. The common secret shared seed for the MPC-based random number generator is used to generate the correlated randomness. The seed is common between the MPC subsystems and secret between the generators. Consequently, all MPC subsystems protected by trusted execution environments generate exactly the same correlated randomness. The agreed assignment of participant numbers ensures that each MPC subsystem protected by a trusted execution environment delivers only the respective secret shares of the correlated randomness to the respective party.

The secret shares of the generated correlated randomness are transmitted to the respective parties either in a loose sequence at the end of the generation process or simultaneously with the generation process via streaming mechanisms. The only interaction takes place between the MPC parties or computing machines and the MPC subsystem protected by the respective collocated trusted execution environment.

Figure 5:
FIG. 5 is a flowchart illustrating the techniques of the present invention for providing correlated randomness for secure multiparty computation.
Figure 5:
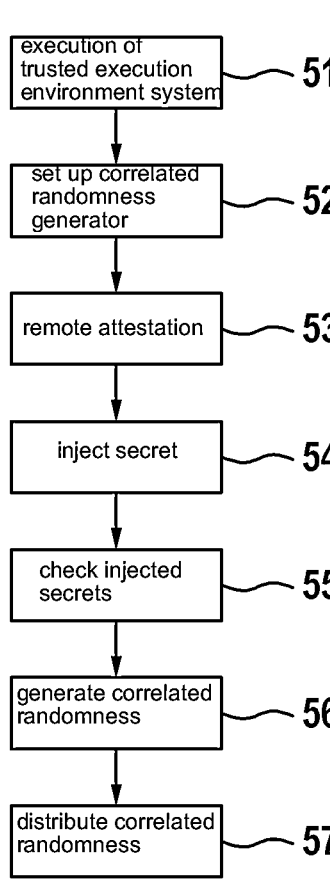

FIG. 5 is a flowchart illustrating the techniques of the present disclosure for providing correlated randomness for secure multiparty computation. In particular, the flowchart shows a computer-implemented method 50 for providing correlated randomness for secure multiparty computation using a plurality of computing machines.

According to the method 50, an execution 51 of a trusted execution environment system 20 is initially effected. The execution environment system 20 can, for example, correspond to one of the execution environment systems 20 shown in FIG. 1 to 4, or to a combination thereof.

A setting up 52 of at least one correlated randomness generator 21 is then effected in the trusted execution environment system. A maximum of one correlated randomness generator 21 is provided in a trusted execution environment.

A remote attestation 53 of a single correlated randomness generator by all computing machines (as in the systems of FIGS. 1 and 3) or a remote attestation of a plurality of correlated randomness generators by in each case one computing machine (as in the systems of FIGS. 2 and 4) is effected.

Furthermore, an injection 54 in each case of at least one secret by all computing machines into a single correlated randomness generator or injection of at least one secret by one computing machine into in each case one correlated randomness generator is effected.

Then, a check 55 of the injected secrets by the correlated randomness generator(s) is effected. This can comprise a byte check or a plausibility check, for example.

Furthermore, a generation 56 of correlated randomness is effected for the computing machines depending on the injected secrets. In the generation, configuration parameters such as arithmetic parameters such as power, prime number, type and number of query tuples can also be taken into account.

Finally, a distribution 57 of the correlated randomness to the computing machines is effected, wherein each computing machine only receives the correlated randomness created for it.

According to one embodiment, the method further comprises that the trusted execution environment system is executed as a single trusted execution environment and that in each case a party communication link is established between the computing machines and the trusted execution environment.

According to one embodiment, the method further comprises that the trusted execution environment system is executed as a trusted execution environment for each computing machine, that in each case a party communication link is established between a computing machine and a trusted execution environment, and that communication links are established between the trusted execution environments.

According to one embodiment, the method further comprises that the trusted execution environments exchange the secrets and/or information regarding the remote attestation and that the trusted execution environments agree on a seed for the correlated randomness generators based on the secrets and/or information regarding the remote attestation.

According to one embodiment, the method further comprises that each trusted execution environment is executed in a plurality of subsystems in each case with a trusted execution environment with a correlated randomness generator, that in each case a party communication link is established between a computing machine and all subsystems, and that communication links are established between the subsystems.

According to one embodiment, the method further comprises that the plurality of subsystems communicates using secure MPC protocols.

According to one embodiment, the method further comprises that the plurality of subsystems communicates via LAN connections.

According to one embodiment, the method further comprises that the plurality of subsystems carries out remote attestation with respect to one another.

According to one embodiment, the method further comprises that at least one computing machine starts a trusted execution environment.

According to one embodiment, the method further comprises that the starting computing machine has a LAN connection to the trusted execution environment.

According to one embodiment, the method further comprises that the secret comprises key shares of the message authentication code, MAC.

According to one embodiment, the method further comprises that the secrets and/or the seed are kept secret in the trusted execution environment system.

What is claimed is:

1. A computer-implemented method for providing correlated randomness for secure multiparty computation using a plurality of computing machines, the method comprising the following steps:

for each of one or more of the plurality of computing machines:

instantiating a respective trusted execution environment system on the respective machine or on a component communicatively coupled to the respective computing machine; and running a respective correlated randomness generator in the respective trusted execution environment system of the respective computing machine;

performing, by each of the computing machines, a remote attestation, the remote attestations verifying an integrity of the one or more correlated randomness generators;

injecting, by each of the computing machines, a respective secret into the one or more correlated randomness generators, wherein either:

(I) the one or more correlated randomness generators includes a single correlated randomness generator (i) for which each of the computing machines performs the remote attestation and (ii) into which the respective secrets of all of the computing machines are injected; or (II) the one or more correlated randomness generators includes a plurality of correlated randomness generators (i) for each of which a respective one of the computing machines performs the remote attestation and (ii) into each of which the respective secret of a respective one of the computing machines is injected;

authenticating, by the one or more correlated randomness generators, the injected secrets for usability;

responsive to the authentication, using, by the one or more correlated randomness generators, the authenticated secrets to generate respective portions of correlated randomness data for respective ones of the computing machines, wherein the correlated randomness data is formed of shares (I) that are randomly formed for the respective ones of the computing machines and (II) that are correlated with one another such that a combination of the shares enables multiparty computation; and distributing, by the one or more correlated randomness generators, the respective portions of the correlated randomness data to the computing machines, wherein each of the computing machines receives only the respective portion of the correlated randomness data that was generated for the respective computing machine.

2. The method according to claim 1, wherein the trusted execution environment system is executed as a single trusted execution environment, and wherein a respective party communication link is established between each of the computing machines and the trusted execution environment.

3. The method according to claim 1, wherein the trusted execution environment system is executed for each computing machine of the computing machines as a respective trusted execution environment, wherein, for each of the computing machines, a respective party communication link is established between the respective computing machine and the respective trusted execution environment, and wherein communication links are established between the trusted execution environments.

4. The method according to claim 3, wherein the trusted execution environments exchange the secrets and/or information regarding the remote attestation, and wherein the trusted execution environments agree on a seed for the correlated randomness generators based on the secrets and/ or the information regarding the remote attestation.

5. The method according to claim 3, wherein the trusted execution environments and the correlated randomness generators form a plurality of subsystems, each of the subsystems including a respective one of the trusted execution environments with a respective one of the correlated randomness generators, wherein, for each of the computing machines, the party communication link is established between the respective computing machine and all of the subsystems, and wherein communication links are established between the subsystems.

6. The method according to claim 5, wherein the plurality of subsystems communicate using secure MPC protocols.

7. The method according to claim 5, wherein the plurality of subsystems communicate via LAN connections.

8. The method according to claim 5, wherein the plurality of subsystems carry out a remote attestation with respect to one another.

9. The method according to claim 2, wherein at least one of the computing machines starts one or more of the instantiated trusted execution environments.

10. The method according to claim 9, wherein a starting computing machine of the computing machines has a LAN connection to the trusted execution environment.

11. The method according to claim 1, wherein the secret includes key shares of a message authentication code (MAC).

12. The method according to claim 1, wherein the secrets and/or a seed are kept secret in the trusted execution environment system.

13. A computer system configured to provide correlated randomness for secure multiparty computation, the system comprising:

a plurality of computing machines that each includes a respective at least one processor, wherein:

each of one or more of the plurality of computing machines is configured to:

instantiate a respective trusted execution environment system on the respective machine or communicatively couple to a component of the computer system that is communicatively coupled to the respective computing machine, a respective correlated randomness generator being run in the respective trusted execution environment system of the respective computing machine;

perform a remote attestation, the remote attestations verifying an integrity of the one or more correlated randomness generators; and inject a respective secret into the one or more correlated randomness generators;

either:

(I) the one or more correlated randomness generators includes a single correlated randomness generator (i) for which each of the computing machines performs the remote attestation and (ii) into which the respective secrets of all of the computing machines are injected; or (II) the one or more correlated randomness generators includes a plurality of correlated randomness generators (i) for each of which a respective one of the computing machines performs the remote attestation and (ii) into in each of which the respective secret of a respective one of the computing machines is injected;

the one or more correlated randomness generators are configured to:

authenticate the injected secrets for usability;

responsive to the authentication, use the authenticated secrets to generate respective portions of correlated randomness data for respective ones of the computing machines;

the correlated randomness data is formed of shares (I) that are randomly formed for the respective ones of the computing machines and (II) that are correlated with one another such that a combination of the shares enables multiparty computation;

the one or more correlated randomness generators are configured to distribute the respective portions of the correlated randomness data to the computing machines; and each of the computing machines receives only the respective portion one of the correlated randomness data that was generated for the respective computing machine.

14. Non-transitory computer-readable media on which are is stored computer programs for providing correlated randomness for secure multiparty computation using a plurality of computing machines, the computer programs, when executed by a computer system including the plurality of computing machines, causing the computer system to perform the following steps:

for each of one or more of the plurality of computing machines:

instantiating a respective trusted execution environment system on the respective machine or on a component communicatively coupled to the respective computing machine, a respective correlated randomness generator being run in the respective trusted execution environment system of the respective computing machine;

performing, by each of the computing machines, a remote attestation, the remote attestations verifying an integrity of the one or more correlated randomness generators;

injecting, by each of the computing machines, a respective secret into the one or more correlated randomness generators, wherein either:

(I) the one or more correlated randomness generators includes a single correlated randomness generator (i) for which each of the computing machines performs the remote attestation and (ii) into which the respective secrets of all of the computing machines are injected; or (II) the one or more correlated randomness generators includes a plurality of correlated randomness generators (i) for each of which a respective one of the computing machines performs the remote attestation and (ii) into in each of which the respective secret of a respective one of the computing machines is injected;

authenticating, by the one or more correlated randomness generators, the injected secrets for usability;

responsive to the authentication, using, by the one or more correlated randomness generators, the authenticated secrets to generate respective portions of correlated randomness data for respective ones of the computing machines, wherein the correlated randomness data is formed of shares (I) that are randomly formed for the respective ones of the computing machines and (II) that are correlated with one another such that a combination of the shares enables multiparty computation; and distributing, by the one or more correlated randomness generators, the respective portions of the correlated randomness data to the computing machines, wherein each of the computing machines receives only the respective portion of the correlated randomness data that was generated for the respective computing machine.

\* \* \* \* \*